UNITED STATES PATENT OFFICE.

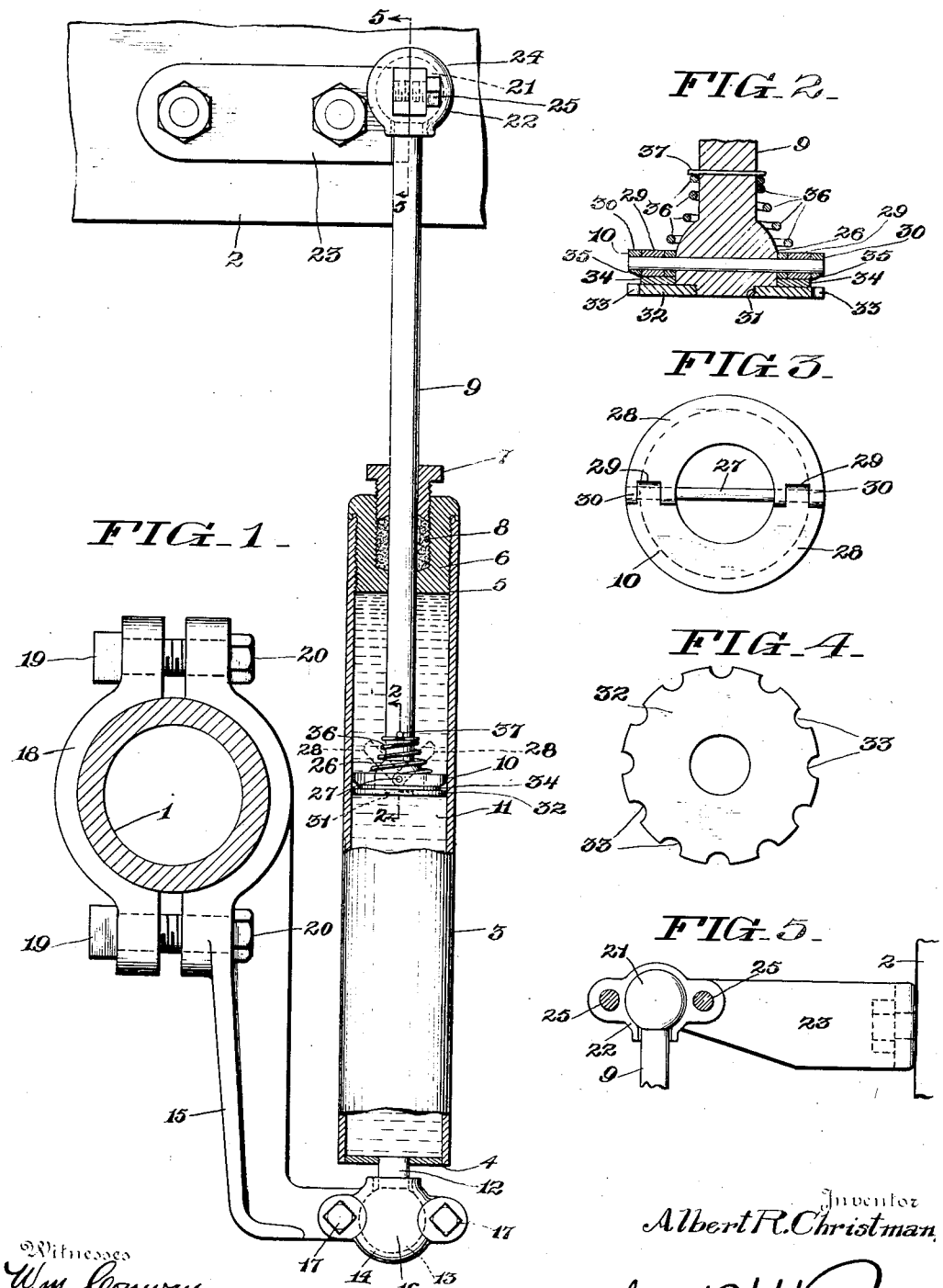

ALBERT R. CHRISTMAN, OF PHILADELPHIA, PENNSYLVANIA, ASSIGNOR OF ONE-HALF TO JULIUS EISENBRAND, OF PHILADELPHIA, PENNSYLVANIA.

SHOCK-ABSORBER.

1,205,432.  Specification of Letters Patent.  Patented Nov. 21, 1916.

Application filed October 18, 1915. Serial No. 56,346.

*To all whom it may concern:*

Be it known that I, ALBERT R. CHRISTMAN, a citizen of the United States, residing at Philadelphia, in the county of Philadelphia and State of Pennsylvania, have invented certain new and useful Improvements in Shock-Absorbers, of which the following is a specification.

My invention relates to improvements in shock absorbers, the object of the invention being to provide an improved arrangement of cylinder and piston, the former containing liquid, and the latter movable in the cylinder and having hinged members which permit the piston an easy movement in one direction and a resisted movement in the other direction, and provide improved mounting for the cylinder and the piston rod which compensate for varying movements of the parts.

A further object is to provide a shock absorber which will be neat and attractive in appearance, which will be strong and durable in use, and which may be used in connection with any ordinary type of automobile or similar vehicle without modification.

With these and other objects in view, the invention consists in certain novel features of construction and combination and arrangements of parts as will be more fully hereinafter described and pointed out in the claims.

In the accompanying drawings: Figure 1 is a view partly in elevation and partly in section illustrating my improvements. Fig. 2 is a fragmentary view in section on an enlarged scale through the piston and piston rod, the section being taken on the line 2—2 of Fig. 1. Fig. 3 is a top plan view of the piston removed from the rod. Fig. 4 is a plan view of the metal disk 32, and Fig. 5 is a fragmentary view in section on the line 5—5 of Fig. 1.

1 represents the axle of an automobile or other similar vehicle, and 2 is a fragment of the frame or movable part of the vehicle which moves vertically relative to the axle 1.

3 is a cylinder having a closed lower end 4, and an internally screw-threaded upper end 5, into which a stuffing box 6 is tightly screwed.

7 is a gland which is screwed into the stuffing box and presses the packing 8 of the gland around the rod 9 of my improved piston 10. The piston 10 fits within the cylinder, and the latter is filled or approximately filled with liquid 11 or other suitable fluid. The lower closed end 4 of cylinder 3 is provided with a relatively short rod 12 having a ball 13 on its lower end which is mounted to move in a spherical socket 14 on a bracket 15, which is clamped to axle 1. This socket 14 is made of two parts, one part being integral with the bracket 15, and the other part removable as shown at 16, and secured by screws 17 to the bracket.

18 represents a movable member which is secured by bolts 19 and nuts 20 to the bracket 15, and constitutes with the bracket a clamp to secure the bracket to axle 1. Bracket 15 is laterally off-set at its lower end as shown so as to position the cylinder 3 away from the axle 1, and give the cylinder sufficient room for all necessary movements.

On the upper end of the rod 9, a ball 21 is provided and is movable in a socket 22 on a bracket 23, the latter bolted to the frame 2. The socket 22 of bracket 23 has a movable member 24 secured by screws 25, and this removable member permits the insertion and disconnection of the ball end of the stem whenever desired. It will, therefore, be noted that the upper end of the stem and the lower end of the cylinder have ball and socket connection with the brackets which are secured to the frame and axle respectively, so that not only is the stem permitted a vertical movement relative to the cylinder, but said parts are permitted all necessary lateral movements without in any manner disconnecting or interfering with the operative juncture of the parts.

The lower or inner end of the rod 9 within cylinder 3 is enlarged as shown at 26, and through this enlargement 26, a pin 27 is projected and pivotally connects the two members 28 of my improved piston 10. The two members 28 are of semi-circular form. One member is recessed at its ends as shown at 29 to receive lugs 30 on the other member 28, and the pin 27 above referred to extends through the overlapping or overlying portions of the two members, and not only connects the two members to the rod, but also permits the said members a pivotal or hinged movement as indicated by the dotted lines in Fig. 1. The extreme lower end of the enlargement 26 is reduced in diameter, and screw-threaded as shown at 31, and a metal disk 32 is screwed onto this threaded end 31 and is of the same diameter as the piston. The outer edge of the disk 32 is recessed as shown at 33 to permit a free flow of liquid in both directions, and a washer 34, preferably of leather, is interposed between the disk 32 and the piston 10. This washer 34 is of appreciably smaller diameter than the piston and the disk, and the lower face of the piston is made with an annular bevel 35 so as to permit the two members of the piston a more ready pivotal movement than would be the case if the periphery of the piston had an extended bearing surface. In other words, as the two members of the piston swing in the arc of a circle, it is advisable to have the periphery of said members relatively narrow or thin, and with this end in view, the surface is beveled as shown at 35. A coiled spring 36 is located around the rod 9 and bears at its lower end against the members 28 of the piston 10, and a pin 37 projected through the rod limits the upward movement of the spring and holds the latter in proper position. The proper position of the spring is to return the two members of the piston to their normal positions, and while of course the flow of liquid also operates to perform this function, the spring insures a quick action and prevents jars and noise.

In operation, when the frame 2 moves downwardly toward the axle 1, the piston 10 will move downwardly in the liquid 11 in cylinder 3. This downward movement is an easy one because the two members 28 of the piston will assume the position shown in dotted lines in Fig. 1, and there will be a large by-pass for liquid. On the return or rebound, the members 28 of the piston will assume their normal positions, and the upward movement of the piston in the cylinder will be resisted by the action of the liquid as the by-passing will be very slight just enough to allow a slow movement of the piston. In all positions and movement, the ball and socket connections of the piston rod and the cylinder compensate for all movements as well as vertical, so that there is no binding or straining of parts, and there is no rattling due to lost motion in any direction.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In a shock absorber, the combination with a cylinder containing liquid, a rod extending into said cylinder, a piston on said rod comprising two members located at opposite sides of the rod, a hinge pin projecting through said members and through the rod, and a disk secured to the end of the rod below said hinged members, said disk fitting the interior of the cylinder and having recesses in its edge permitting the liquid to flow therethrough, substantially as described.

2. In a shock absorber, the combination with a cylinder containing liquid, a rod extending into said cylinder, a piston on said rod comprising two members located at opposite sides of the rod, a hinge pin projecting through said members and through the rod, a disk secured to the end of the rod below said hinged members, said disk fitting the interior of the cylinder and having recesses in its edge permitting the liquid to flow therethrough, a spring surrounding said rod, means on said rod forming an abutment for one end of said spring, the other end of said spring being in engagement with said hinged members to move them toward said disk, substantially as described.

3. In a shock absorber, the combination with a cylinder containing liquid, a stuffing box in one end of the cylinder, a rod projecting through the stuffing box, a piston comprising two members located at opposite sides of the rod, a hinge pin projecting through said members and through the rod, and a disk detachably secured to the lower end of said rod and fitting the said cylinder, said disk having recesses in its edge forming passageways for said liquid, substantially as described.

4. In a shock absorber, the combination with a cylinder containing liquid, a stuffing box in one end of the cylinder, a rod projecting through the stuffing box, a piston comprising two members located at opposite sides of the rod, a hinge pin projecting through the said members and through the rod, a disk secured to the end of the rod and having recesses in its edge, and a washer interposed between the disk and the two members of the piston limiting the movement of said members in one direction, substantially as described.

5. In a shock absorber, the combination with a cylinder containing liquid, a stuffing box in one end of the cylinder, a rod projecting through the stuffing box, a piston comprising two members located at opposite sides of the rod, a hinge pin projecting through the said members and through the rod, a disk secured to the end of the rod and having recesses in its edge, a washer interposed between the disk and the two members of the piston limiting the movement of said members in one direction, and a coiled spring around the rod exerting pressure on the members tending to force them against the washer, substantially as described.

6. In a shock absorber, the combination with a cylinder, and a rod projecting from one end of the cylinder, said rod having an enlargement on its inner end, a disk screwed onto the end of the rod and having recesses in its periphery, a piston on the enlargement comprising two hinged members located adjacent the disk, a washer interposed between the members and the disk, a coiled spring around the rod pressing the members against the washer, said disk and piston of the same diameter, and said piston having an annular beveled surface, substantially as described.

In testimony whereof I have signed my name to this specification in the presence of two subscribing witnesses.

ALBERT R. CHRISTMAN.

Witnesses:
CHAS. E. POTTS,
MARIE JACKSON.